United States Patent [19]

Devore

[11] Patent Number: 5,231,061
[45] Date of Patent: Jul. 27, 1993

[54] PROCESS FOR MAKING COATED CERAMIC REINFORCEMENT WHISKERS

[75] Inventor: David D. Devore, Midland, Mich.

[73] Assignee: The Dow Chemical Company, Midland, Mich.

[21] Appl. No.: 713,231

[22] Filed: Jun. 10, 1991

[51] Int. Cl.$^5$ .............................. C04B 35/80
[52] U.S. Cl. .................... 501/95; 501/128; 428/378; 428/368
[58] Field of Search .............. 501/95, 89, 92, 97, 501/128; 428/367, 378, 391, 368

[56] References Cited

U.S. PATENT DOCUMENTS

| | | |
|---|---|---|
| 4,376,803 | 3/1983 | Katzman . |
| 4,642,271 | 2/1987 | Rice ................... 501/95 X |
| 4,758,539 | 7/1988 | Brown et al. ............ 501/96 |
| 4,801,510 | 1/1989 | Mehrotra et al. . |
| 4,806,428 | 2/1989 | Cooper et al. . |
| 4,814,202 | 3/1989 | Castelas . |
| 4,898,749 | 2/1990 | Ritsko et al. . |
| 4,911,992 | 3/1990 | Haluska et al. . |
| 4,915,760 | 4/1990 | Singh et al. .......... 264/60 X |
| 5,051,301 | 9/1991 | Singh et al. .......... 501/95 X |
| 5,055,430 | 10/1991 | Sakamoto et al. ........ 501/95 X |

FOREIGN PATENT DOCUMENTS 1-188476 7/1989 Japan .
2-307872 12/1990 Japan .
2-307900 12/1990 Japan .

OTHER PUBLICATIONS

Fix, R. M. et al., "Synthesis of Thin Films By Atmospheric Pressure Chemical Vapor Deposition Using Amido and Imido Titanium (IV) Compounds as Precursors", 2 *Chem Mater.* (No. 3) 235–41 (1990).
Brown et al., "Process For Producing Ceramic Nitrides And Carbonitrides And Their Precursors", DOE Resch. and Devel. Report No. DE-AC05-840RE1400.

*Primary Examiner*—Karl Group

[57] ABSTRACT

A ceramic whisker body is disclosed which is coated with an oxide or non-oxide ceramic coating which is uniform, continuous, non-particulate and when the whisker is incorporated into a whisker reinforced ceramic matrix composite, the ceramic coating inhibits fusing between the whisker and the matrix, yielding a strengthened ceramic composite. An efficient method for applying both oxide and non-oxide ceramic coatings onto ceramic whiskers is also disclosed.

1 Claim, 3 Drawing Sheets

FIG I

PROCESS FOR MAKING COATED CERAMIC REINFORCEMENT WHISKERS

Statement as to Rights to Inventions Made Under Federally-Sponsored Research and Development The U.S. Government has a paid-up license in this invention and the right in limited circumstances to require the patent owner to license others on reasonable terms as provided for by the terms of contract No. N609210880C-0233 awarded by Naval Surface Warfare Center.

TECHNICAL FIELD

This invention relates generally to coated ceramic whiskers, and more particularly relates to ceramic whiskers coated by evaporating and pyrolyzing organometallic precursor solutions thereon.

BACKGROUND OF THE INVENTION

High thermal stability and mechanical strength are much needed characteristics which make certain materials attractive candidates for applications such as heat engines, cutting tools, and turbine blades, articles which are presently made with expensive super alloys. Advanced ceramic materials are chemically inert compounds which have these desired characteristics. Current interest in these advanced ceramics centers around such materials as carbides, nitrides, borides, and silicides which have properties of hardness, corrosion resistance, and thermal stability that cannot be matched by metallic alloys or other structural materials. Examples of these ceramic materials are SiC, $Si_3N_4$, TiC, TiN, VC, WC, and BN.

Although ceramic articles are valued for their extreme hardness, a major drawback has been their brittleness. Upon sufficient stress, a ceramic article will undergo catastrophic failure due to one or more cracks propagating through the material. Traditionally, ceramic whiskers have been used to reinforce composite ceramic articles. The whiskers, when incorporated into a ceramic matrix, add strength toughness to the resulting whisker-reinforced composite.

By dispersing whiskers or fibers into a ceramic matrix, a composite ceramic is formed which can resist cracking to a much larger degree than would be the case with just the ceramic material alone. As the density of whiskers is relatively high in these whisker reinforced ceramics, a crack starting in the material will probably encounter a whisker before it has a chance to propagate a significant distance. Ideally, when the crack reaches the whisker, it is deflected along the whisker-matrix interface instead of through the matrix, the result being that the crack is deflected instead of being allowed to propagate first through the whisker itself, and then through the remainder of the ceramic material. Because of this crack-deflecting property, a weak whisker-matrix interface actually helps to give the ceramic composite material increased strength.

Therefore, it is not desirable for the whiskers to be fused to the ceramic matrix since if they were fused, the whisker-matrix interface would be too strong and any crack started in the matrix material may continue through a cross-section of the whisker and subsequently the remainder of the ceramic matrix material. This undesirable situation will be evident upon examining the fractured surface of a composite material wherein the whiskers may be observed as having been cleaved along with the immediately surrounding ceramic matrix. Whisker pullout, on the other hand, occurs when a composite article with weak whisker-matrix interfaces is fractured and the whiskers protrude from the surface on one side of the fracture, while the complementary recesses remain where the ends of the whiskers previously resided in the matrix on the other side of the fracture. This pullout is strongly affected by the whisker-matrix interfacial shear strength.

Consequently, reducing the strength of the bond at the whisker-matrix interface in whisker reinforced ceramic composites encourages the deflection of any propagating cracks, thereby increasing the strength and toughness of the composite. Attempts at reducing the strength of the whisker-matrix interfaces have included reducing or eliminating the fusion of the whisker to the matrix. Examples of such attempts have included choosing optimum matrix and whisker combinations, since some combinations naturally tend not to fuse together as strongly as others. Other attempts have involved using whiskers which had higher coefficients of thermal expansion than those of the matrix. However, it was observed that this caused the whisker to pull away from the matrix as the article cooled after having been formed by firing. This pulling away from the matrix helped to keep the whisker and matrix from fusing.

Another method, which has been used in the past, included coating the whiskers, prior to dispersion into the matrix, with a material that would not fuse, or at least not fuse well, with the matrix. From these methods, one could see that an appropriate coating could lower the interfacial shear strength and also increase whisker pullout, resulting in greatly increased strength and toughness of the ceramic composite article.

Improved whisker-reinforced composite ceramic articles have been made by using whiskers which have been coated with one or more various ceramic or oxide coatings. The coatings were intended to prevent fusing of the whiskers to the matrix. These coatings, in addition, were sometimes intended to act as diffusion barriers for fiber-matrix combinations which would otherwise be incompatible since reactions between the materials could lead to fiber degradation. The methods used for applying these coatings to whiskers have been complicated, and often involved lengthy and/or expensive steps in their preparation. Another drawback was the limited types of coatings that any particular method could provide. Several such types of coatings were $SiO_2$, $TiO_2$, and $AlO_2$ which could be coated onto mullite, alumina, and silicon nitride whiskers.

A certain degree of success has been experienced with whisker and fiber coatings fabricated by means of chemical vapor deposition as well as sublimation techniques. However, these processes, which can be somewhat complicated, result in nonuniform coatings due to their inability to properly expose all the surfaces of the whiskers during deposition.

Other coating processes which have been attempted have involved immersing carbon fibers or other substrates into solvents containing specific precursor materials, and then drying them in order to coat the fibers or substrates with the precursor material, which could then be subsequently processed into more stable ceramic or metal oxide coatings adhered to the surface of the fibers or substrate. These processes were limited, however, in that they could only coat one type of coating, for instance, either an oxide coating, or a ceramic coating, depending on the specific process.

Still other coating processes have involved immersing whiskers in a colloidal sol containing particles of oxides, and then drying the whiskers, leaving them coated with a particulate oxide coating. However, since the coating is particulate, and therefore is likely to form a non-continuous coating, the areas between individual particles left bare could serve as opportunistic sites for fusion between the matrix and the uncoated whisker surface. These particulate coatings have been used primarily to aid the dispersion of the whiskers into the matrix and not to inhibit fusion between the whisker and the matrix.

Yet still another prior art process involved incorporating whiskers into a matrix before the coating was actually completely formed. This meant that the introduction of the whiskers into the matrix material had to be done simultaneously with the final stages of the formation of the whisker coating. This requirement put undesirable constraints on both the whisker coating process and on the process of incorporating the whiskers into the matrix.

Examples of previous attempts to make useful coatings on ceramic whiskers are described in the following patents.

U.S. Pat. No. 4,806,428 issued to Cooper et al. on Feb. 2, 1989 and assigned to Corning Glass Works, Corning, N.Y., discloses a method for making a whisker-reinforced composite ceramic article which involves the steps, first, of forming a liquid sol or colloid comprising colloidal particles of one or more inorganic oxides. Generally, these oxides were selected from the group consisting of $SiO_2$, $Al_2O_3$, CaO, MgO, BaO, $ZrO_2$, $TiO_2$ and $P_2O_5$. The sol was typically a water/alcohol-based sol wherein the oxide particles were generated by hydrolysis of alkoxides of the metallic constituents of these oxides. The sol was combined with an inorganic whisker reinforcement material, the material typically being selected from the group consisting of SiC, $Si_3N_4$, C, $Al_2O_3$ or a similar refractory inorganic whisker material. The combination was effected so as to form a uniform dispersion of the whiskers in the sol, which was separated into fine droplets and dried to form a dried particulate product comprising oxide encapsulated or oxide-coated whiskers. The oxide coating on the whiskers was made up principally of the oxide or mixture of oxides present in the initial fluid sol, and could be characterized as an assemblage of agglomerated, submicron-sized oxide particles forming a generally continuous coating over individual whiskers or whisker clusters. The oxide particles may be hydrous or hydrated oxides, and were generally, though not necessarily, present on the in an unreacted form, i.e. free oxide or hydrous oxide form.

U.S. Pat. No. 4,376,803 issued to Katzman on Mar. 15, 198? and assigned to The Aerospace Corporation, Los Angeles, Calif. discloses a carbon fiber reinforced metal matrix composite produced by metal oxide coating the surface of the fibers by passing the fibers through an organometallic solution followed by pyrolysis or hydrolysis of the organometallic compounds. The metal oxide coated fibers so produced were wettable without degradation when immersed in a molten bath of the metal matrix material. Features of the invention include the use of metal oxide coatings to facilitate wetting of graphite fibers, and the use of alkoxide and organometallic solutions to deposit uniform metal oxide coatings on the surfaces of fibers.

U.S. Pat. No. 4,814,202 issued to Castelas on Mar. 21, 1989 and assigned to Centre Meridional d'Oenologie, Clermont-L'herault, France discloses processes for manufacturing thin membranes composed of an inorganic lattice of titanium and silicon oxides, wherein one or more titanium alkoxides and one or more silicon alkoxides are placed in solution in the same solvent, in order to obtain mixed titanium and silicon alkoxides. The mixed alkoxides were partially hydrolyzed by adding a basic aqueous solution having a pH of between 11 and 12 to apply a layer of hydrolyzed solution on a substrate. The particles in suspension were separated, the residual alkyl groups were eliminated by evaporation, and baking was effected at a temperature of between 700° C. and 1250° C. The processes according to the Castelas invention manufactured porous and/or semi-permeable membrane filter surfaces for filter, microfiltration, ultrafiltration or reverse osmosis cartridges.

U.S. Pat. No. 4,898,749 issued to Ritsko et al. on Feb. 6, 1990 and assigned to GTE Products Corporation, Stanford, Conn. discloses a method for producing aluminum oxide coated cobalt powder which comprises contacting cobalt powder of a fine particle size with a liquid aluminum compound wherein the aluminum is hydrolyzable, and adding water to the compound and the cobalt powder to form a slurry, removing essentially all of the liquid from the slurry to produce cobalt powder with a coating of hydrolyzed aluminum oxide, and firing the cobalt powder with the hydrolyzed aluminum oxide coating in a non-oxidizing atmosphere to produce cobalt powder having a coating of aluminum oxide.

U.S. Pat. No. 4,749,631 issued to Haluska et al. on Jun. 7, 1988 and assigned to Dow Corning Corporation, Midland, Mich. coats substrates by diluting a preceramic mixture of a partially hydrolyzed silicate ester in a solvent, the mixture then being applied to a substrate and ceramified by heating. One or more ceramic coatings containing silicon carbon, silicon nitrogen, or silicon carbon nitrogen can be applied over the ceramified $SiO_2$ coating. A CVD or PECVD top coating can be applied for further protection. The invention was described as being particularly useful for coating electronic devices.

U.S. Pat. No. 4,911,992 issued to Haluska et al. on Mar. 27, 1988 and assigned to Dow Corning Corporation, Midland, Mich. coats substrates by diluting a platinum or rhodium catalyzed preceramic mixture of a hydrogen silsesquioxane resin in a solvent with a metal oxide precursor selected from the group consisting of an aluminum alkoxide, a titanium alkoxide, and a zirconium alkoxide. The preceramic mixture solvent solution is applied to a substrate and ceramified by heating. One or more ceramic coatings containing silicon carbon, silicon nitrogen, or silicon carbon nitrogen can be applied over the ceramified $SiO_2$/metal oxide coating. A CVD or PECVD top coating can be applied for further protection. The invention is particularly useful for coating electronic devices.

U.S. Pat. No. 4,801,510 issued to Mehrotra et al. on Jan. 3, 1989 and assigned to Kennametal Inc., Latrobe, Pa. discloses an article of manufacture having a SiC whisker reinforced alumina matrix substrate which has an alumina coating bonded to its exterior surface. The articles are described as having been found useful for cutting inserts in the high speed rough machining of steels.

U.S. Pat. No. 4,758,539 issued to Brown et al. discloses a process for preparing ceramic nitrides and carbonitrides in the form of very pure, fine particulate powder. An appropriate precursor is prepared by reacting a transition metal alkylamide with ammonia to produce a mixture of metal amide and metal imide in the form of an easily pyrolyzable precipitate.

Consequently, it would be desirable to have a process for efficiently coating ceramic whiskers with a uniform, continuous, non-particulate ceramic coating which would inhibit fusion between the whiskers and the matrix material when used in a whisker reinforced ceramic composite. It would also be desirable if the process was adapted to coat a wide selection of both oxide and non-oxide coatings, especially if the coating process could be completed on the whiskers before incorporating them into a whisker reinforced ceramic composite.

Therefore, it is a primary object of the present invention to provide a ceramic whisker coated with an oxide or non-oxide ceramic coating which is uniform, continuous, non-particulate and, when the whisker is incorporated into a whisker reinforced ceramic matrix, the ceramic coating inhibits fusing between the whisker and the matrix, yielding a strengthened composite.

It is yet another object of the present invention to provide an efficient method for applying both oxide and non-oxide ceramic coatings onto a ceramic whisker.

It is another object of the present invention to provide an efficient method for applying a uniform, continuous, non-particulate ceramic coating with a controllable thickness onto a ceramic whisker which, when incorporated into a whisker reinforced ceramic matrix, inhibits fusing between the whisker and the matrix, yielding a strengthened composite.

SUMMARY OF THE INVENTION

In accordance with a preferred embodiment of the invention, these and other objects and advantages are addressed as follows. A ceramic whisker body is disclosed wherein the ceramic whisker is coated with an oxide or non-oxide ceramic coating which is uniform, continuous, non-particulate and, when the whisker is incorporated into a whisker reinforced ceramic matrix, the ceramic coating inhibits fusing between the whisker and the matrix, yielding a strengthened composite. The ceramic whisker body itself is combined with a uniform, continuous, non-particulate ceramic coating which is formed on the ceramic whisker bodies by mixing a solvent and an organometallic coating precursor with the ceramic whiskers, evaporating the solvent from the mixture to yield whiskers which are coated with the dried ceramic coating precursor, and then pyrolyzing the ceramic precursor-coated ceramic whiskers in an appropriate gaseous atmosphere. When the ceramic whisker body is incorporated into a ceramic matrix material to form a whisker-reinforced ceramic matrix composite, the ceramic coating serves to reduce the fusion between the ceramic whisker body and the matrix material.

This results in a strengthened composite because cracks propagating through the matrix are substantially stopped when they meet with the whisker coating-matrix interface. As the fusion between the coated whisker and the matrix is minimized, there is not a medium present through which the crack may continue to propagate.

The ceramic whiskers of the present invention can be coated with oxides as well as non-oxides such as nitrides, carbides, and borides. The ceramic whisker body can be made of various known ceramics, such as mullite, silicon carbide, aluminosilicates, alumina, and aluminum borate. The technique of producing the ceramic coated ceramic whiskers of the present invention can also be used to put TiN coatings on $Si_3N_4$ and tungsten carbide/cobalt cutting tools.

Also disclosed is a method of coating a uniform, continuous, non-particulate ceramic coating on a ceramic whisker body, said method including the steps of mixing a solvent and an inorganic coating precursor with ceramic whiskers, evaporating the solvent to yield whiskers which are coated with a dried ceramic coating precursor material, and thereafter pyrolyzing the dried, precursor coated ceramic whiskers in a gaseous atmosphere to form a uniform, continuous, non-particulate ceramic coating on the ceramic whiskers. The pyrolyzing step may include heating the whiskers at a slow enough rate so that the gaseous atmosphere may react substantially with the dried coating precursor before substantial pyrolyzation occurs. The solvent used in this method may include hydrocarbon solvents, diethyl ether, alcoholic solvents such as ethanol, and tetrahydrofuran (THF). The step of mixing the solvent with a precursor in presence of the ceramic whiskers may be performed by stirring the whiskers for at least ten seconds in the solvent.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE INVENTION

Figure 1:
FIG. 1 is a TEM photograph of a ceramic whisker of the present invention revealing a cross section of a whisker wherein a uniform, continuous coating can be seen residing in intimate contact with the surface of the whisker.

The present invention is a coated ceramic whisker product formed by a pyrolyzing process which serves to coat the ceramic whiskers with oxide or non-oxide ceramic coatings. As described above, the coated whisker can be used to reinforce a ceramic matrix material to help strengthen the matrix against cracking. The pyrolyzing process makes use of an organometallic precursor material to form the ceramic coatings, meaning that initially the material is not a ceramic, although it will be converted into the final ceramic material which coats the whisker at some point during the pyrolyzing step.

Basically, the coated ceramic whiskers are formed by: (1) mixing ceramic whiskers in a solution containing a solvent and an organometallic precursor material, (2) evaporating the solvent from the solution which leaves the precursor material adhered to the whisker surface as a dried solid coating on the whiskers, and (3) heating the whiskers coated with the precursor material in an appropriate atmosphere so that the precursor is pyrolyzed and thereby converted into a ceramic coating on the ceramic whisker.

The precursor materials of the present invention are organometallic compounds and mixtures of organometallic compounds. In accordance with the present invention, the molecules of organometallic compounds include metal atoms linked to organic units or carbon atoms, and they are mixed in a solvent which acts as a vehicle to bring the organometallic compound molecules in contact with the whiskers. This solution will be referred to hereinafter as the organometallic ceramic coating precursor or the coating precursor.

The specific organometallic coating precursors which may be used in the present invention will depend on the desired final ceramic coating to be formed on the whisker. For instance, if a TiN coating is desired, one may employ $Ti(NMe_2)_4$ as the organometallic compound in the coating precursor. On the other hand, if an $SiO_2$ coating is desired, one employ $Si(OEt)_4$ as the organometallic compound in the coating precursor.

Generally, the compound may be described as $M_xN_y$ or $M_xO_y$. There are three groups from which to choose the organometallic compound, one for nitride coating precursors, one for oxide coating precursors, and one for carbide coating precursors, and they are all generally selected from Group IV through VI elements. In the case of Group VB and VIB transition metal amides and oxides, the general formulations are either $M_x(NR_2)_y$ or $M_x(OR)_y$ due to the relatively broad range of valence numbers for the metallic element component. For example, the vanadium versions of these formulations would be $V(NR_2)_4$ and $V(OR)_3$, while the niobium series would be $Nb(NR_2)_4$ and $Nb(OR)_5$, and the chromium series would be $Cr(NR_2)_4$ and $Cr(OR)_3$. However, it may be possible to have fewer or greater numbers of $-(NR_2)-$ or $-(OR)-$ groups attached to each metallic element, hence the recitation of $M_x(NR_2)_y$ or $M_x(OR)_y$.

Possible nitride coating precursors are as follows:

| Organometallic Precursor | Resultant Ceramic Coating |
|---|---|
| Titanium tetra amide, $Ti(NR_2)_4$ | TiN |
| Zirconium tetra amide, $Zr(NR_2)_4$ | ZrN |
| Hafnium tetra amide, $Hf(NR_2)_4$ | HfN |
| Vanadium tetra amide, $V(NR_2)_4$ | VN |
| Niobium tetra amide, $Nb(NR_2)_4$ | NbN |
| Tantalum tetra amide, $Ta(NR_2)_4$ | TaN |
| Chromium tetra amide, $Cr(NR_2)_4$ | CrN |
| Molybdenum tetra amide, $Mo(NR_2)_4$ | MoN |
| Tungsten tetra amide, $W(NR_2)_4$ | WN |
| Silizanes, $(SiMe_2NH)_x$ | $Si_3N_4$ |
| $B(NMe_2)_3$ | BN |
| $Hf(NMe_2)_4$ | HfN |
| $Zr(NMe_2)_4$ | ZrN |

Possible oxide coating precursors are as follows:

| Organometallic Precursor | Resultant Ceramic Coating |
|---|---|
| Titanium tetra alkoxide, $Ti(OR)_4$ | $TiO_2$ |
| Zirconium tetra alkoxide, $Zr(OR)_4$ | $ZrO_2$ |
| Hafnium alkoxide, $Hf(OR)_4$ | $HfO_2$ |
| Vanadium oxy trialkoxide, $V(OR)_3$ | $V_2O_5$ |
| Niobium penta alkoxide, $Nb(OR)_5$ | $Nb_2O_5$ |
| Tantalum penta alkoxide, $Ta(OR)_5$ | $Ta_2O_5$ |
| Chromium trialkoxide, $Cr(OR)_3$ | $Cr_2O_3$ |
| Molybdenum alkoxide, $Mo_2(OR)_6$ | $MoO_3$ |
| Tungsten penta alkoxide, $W(OR)_5$ | $WO_3$ |
| Tetraethoxysilane, $Si(OEt)_4$ | $SiO_2$ |
| $Al(O^sBu)_3$ | $Al_2O_3$ |

| Organometallic Precursor | Resultant Ceramic Coating |
|---|---|
| $Zr(O^nBu)_4$ | $ZrO_2$ |

Possible carbide coating precursors are as follows:

| Organometallic Precursor | Resultant Ceramic Coating |
|---|---|
| Boranes, $(B_{10}H_{12}N_2NCH_2CH_2NH_2)_x$ | $BN/B_4C$ (depending on the atmosphere gas) |

The solvent used to form the organometallic solution can be any solvent which dissolves the organometallic compound and which does not interfere with the process of transforming the organometallic compound into the final ceramic coating upon pyrolysis. The preferred solvents are certain hydrocarbon solvents such as toluene and heptane if the precursors to be used are soluble in these. For nitride or carbide coatings, other highly volatile hydrocarbon solvents which preferably do not contain oxygen may also be used, such as octane, hexane, pentane, etc., so long as the precursors are soluble in these. Also for carbide and nitride coatings, it is preferable that there be as little water as possible in the organometallic solution, as the water would react with the organometallic compound to form oxides.

Certain conditions may be advantageous for the organometallic solutions. It is preferable for the solutions to be de-oxygenated. It has been found that water and oxygen will often react with the precursors of the present invention, that is, they are air and moisture sensitive. For solutions containing oxide coating precursors, the presence of water or oxygen containing solvents in the organometallic solution are not necessarily a problem. For these coatings, or for coatings using precursors which are not soluble in hydrocarbon solvents, other suitable organic solvents including ethers such as diethyl ether, alcoholic solvents such as ethanol, and tetrahydrofuran (THF).

The organometallic compounds utilized in the present invention are very sensitive to moisture, oxygen and alcohol and are very reactive to hydroxyls. Therefore, the handling of the organometallic coating precursor and the whiskers is preferably done in an inert atmosphere that does not contain substantial amounts of oxygen or water vapor. The way in which the compounds react with water may play a role in the adhesion of the precursor to the whiskers. It is suspected that the first monolayer of molecules in contact with the ceramic whiskers react with hydroxyls on the surface of the whiskers and this probably has to do with the adhesion that has been observed. The adhesion of the coatings of the present invention has been observed to be very good.

After the whiskers have been immersed in the solvent containing the coating precursor, enough time should be given to allow the surfaces of the whiskers to come in contact with, and to adhere to, a sufficient amount of the organometallic compound in order to form at least a first monolayer of the organometallic molecules. This is believed to occur rapidly upon immersion of the whiskers in the solvent. The amount of time the whiskers will spend in suspension during the remaining steps of the coating process should be more than sufficient to achieve good coatings. The whisker suspension is preferably stirred for at least ten seconds before further processing is done in order to result in a more uniform coating, although the amount of time the whiskers are stirred is not believed to be very important and the stirring could even be considered as an optional step. The resultant surface of the coating is contoured.

When the immersion stage is finished, the solvent is evaporated off, preferably in vacuo. Typically, at this point, the whiskers are in the form of a solid which is easily broken up. Hence, the whiskers are not fused to the point where they would have to be separated by applying large forces which would complicate the process and could damage the whiskers. It was felt that this characteristic of the dried whiskers was a fortunate discovery, since it gives the present invention the added benefit of providing individual whiskers, as opposed to fused clumps of whiskers as might be expected. For example, the whiskers coated with the precursor material for a TiN coating are free-flowing rather than a mass of whiskers embedded in a TiN matrix. This characteristic makes the whiskers suitable for a wide range of applications including incorporation into a whisker reinforced composite ceramic.

In accordance with the present invention, the dried coating precursor is pyrolyzed in order to convert precursor into the final ceramic coating. The temperature range in which this is preferably to be done will depend on the specific coating precursor used, but should be high enough for the coating precursor to become substantially pyrolyzed. A typical temperature range in which pyrolysis occurs for the coating precursors of the present invention is from 200° C. to 1000° C. The pyrolysis is preferably done in an appropriate atmosphere, that is, in an atmosphere which will support, or at least not interfere with, the chemical reaction that converts the coating precursor into the desired final ceramic coating. It may also be preferable to heat the whiskers up to the pyrolyzing temperature slowly enough to allow the precursor to react with the surrounding atmosphere before pyrolysis occurs. For example, for an oxide coating the precursor may react with oxygen in an air atmosphere or, for a nitride coating, the precursor may react with ammonia in an ammonia gas atmosphere.

For nitride coatings such as TiN from the precursor compound $Ti(NMe_2)_4$, the pyrolysis preferably takes place in an atmosphere of argon and ammonia gas, with the ammonia serving as a reductant. An atmosphere of nitrogen and ammonia gas should also work well. It is also possible to use atmospheres which comprise mixtures of ammonia and any inert gas or combinations of inert gases.

In either case of using argon or nitrogen with ammonia gas, the following is believed to occur during pyrolysis: the ammonia reacts with the precursor $Ti(NMe_2)_4$ on the surface of the whisker, the amine $NHMe_2$ is eliminated, and the adjacent Ti centers are linked by an —NH— group. In this way, a type of polymeric network is developed over the surface of the whisker which is converted to TiN at the end of the pyrolysis. The pyrolysis of the nitride precursors may also take place in an atmosphere comprising inert gases only. However, the argon/ammonia gas or nitrogen/ammonia gas atmospheres should yield a more pure nitride coating, that is, with fewer carbides present than might be the case with using atmospheres comprising inert gases only.

Figure 2:
FIG. 2 is a TEM photograph of the side of a coated whisker in accordance with the present invention, showing the contoured surface.
Figure 3:
FIG. 3 is a TEM photograph showing the side edge of a coated whisker body.

The above described embodiment of a TiN coating can be seen in FIGS. 1-3, which are TEM photographs of a TiN coated mullite whisker. FIG. 1 is a cross sectional view at 300,000×, which shows the coating of TiN on a mullite whisker. FIGS. 2 and 3 illustrate two other views of a single whisker in FIG. 2, and the edge of a coated whisker in FIG. 3. Both FIGS. 2 and 3 have been taken at 150,000×. As can be seen from the photographs, the coating appears to be uniform, continuous, and non-particulate and conforms to the surface and contour of the whisker, so the coating is contoured. It is believed that the above described advantages are those which help to yield a strengthened whisker-reinforced ceramic matrix material when the whiskers as shown in FIGS. 1 through 3 are incorporated into a ceramic matrix composite.

If a carbide coating is desired, the pyrolysis preferably takes place in an atmosphere of argon and hydrogen, in particular, an atmosphere containing about five (5) volume percent hydrogen in a balance of argon. An atmosphere of nitrogen and hydrogen may also work well. It may also be possible to use atmospheres which comprise mixtures of hydrogen and any inert gas or combinations of inert gases. In these atmospheres, the hydrogen may help to remove extra carbon produced during pyrolysis.

If an oxide coating is desired, for example an $SiO_2$ coating from the precursor $Si(OEt)_4$, then the pyrolysis can be done in air which is either dry or contains water vapor, although moist air is preferred. It should also be possible to use an atmosphere containing a mixture of an inert gas or a combination of inert gases, along with oxygen gas, or water vapor or both. In this case either oxygen in the air, or water in the atmosphere or both, would react with the precursor resulting, it is believed, in a type of polymeric network over the whisker. During pyrolysis, then, the network would be converted into $SiO_2$.

In any of the above described examples, the whiskers are cooled to room temperature after pyrolyzing and are found to be easily separatable, much as they were following the evaporation of the coating precursor. Again, this facilitates their final processing as well as their use in applications such as the incorporation of the whiskers into whisker reinforced ceramic composites. This characteristic offers better control of the coating composition as well as better control over the manufacture of the resultant reinforced ceramic composite when compared to that of processes which coat the whiskers simultaneously with their incorporation into a ceramic matrix.

The thickness of the final ceramic coatings is easily controlled by varying the loading of the organometallic precursor compound in the solvent. Varying the loading translates simply to controlling the amount of organometallic precursor adhering to each whisker after the solvent is evaporated. Useful whisker diameters for incorporation into whisker-reinforced ceramic composites are from about 4 to about 30 microns. On these whiskers, the range of useful coating thicknesses were found to be from about 40 to about 200 nm. More preferable coating thickness were found to be 70 to about 85 nm.

Specific ceramic whiskers made of aluminosilicates, such as mullite, silicon carbide, alumina, and alumina borate could be coated by the above described process. Many combinations of ceramic whisker compositions and coating compositions are possible using this process.

The present invention, therefore, provides ceramic whiskers combined with a uniform, continuous, non-particulate ceramic coating thereon. When the ceramic coated ceramic whiskers are incorporated into a ceramic matrix material to form a whisker-reinforced ceramic composite, the uniform, continuous, non-particulate ceramic coating serves to reduced the fusion between the ceramic whisker body and the matrix material, hence, yielding a stronger, tougher ceramic body.

The ceramic materials desired by the industry are ones which resist brittleness, and breakage during shipping, using and repair. It is believed that if a crack begins to propagate through a ceramic matrix material, the unfused coated ceramic whiskers made in accordance with the present invention would help to substantially stop the propagation of the crack through the matrix material. This provides a particular advantage over prior art ceramic matrix materials in that a crack which might start on one side of the material would not continue on throughout the entire material so as to cause complete breakage.

It is postulated that a crack passing through a matrix material will encounter the unfused coated ceramic whisker-matrix interface and be deflected because the whisker is not fused to the matrix material. As one can imagine, if the ceramic whisker, used to reinforce the matrix material, was directly fused and bonded to the matrix material, the crack would continue to propagate from the matrix material through the ceramic whisker, and continue on through the matrix material to the opposite side of the ceramic whisker. Therefore, it appears to be advantageous to reinforce a ceramic matrix material with whiskers which do not fuse to the matrix material itself, but still act to reinforce the matrix.

The following examples illustrate particular coatings on various types of whiskers.

EXAMPLE 1

TiN Coating On Mullite Whiskers

In an argon filled dry box, approximately 40 ml of dry, degassed toluene was added to a 250 ml flask containing 1.0 g of mullite whiskers. A solution of Ti(NMe$_2$)$_4$ (0.109 g, 0.0005 mol) in 10 ml toluene was added to the flask containing the stirred suspension of whiskers. The contents of the flask were stirred for one hour in vacuo as the solvent was removed by evaporation. The whiskers were left as a dry yellow solid.

In an argon filled dry box, the resultant Ti(NMe$_2$)$_4$ coated whiskers were loaded into an alumina pyrolysis boat. The boat was then placed into a glass tube which was sealed on one end and fitted with a 45/50 joint on the remaining open end. The tube was capped and then transferred to an argon filled glove bag that was taped onto the end of a mullite furnace tube. The glove bag was closed and flushed with argon for approximately 1 hour and 20 minutes. After an inert atmosphere was obtained, the transfer tube was opened, the boat and sample were inserted into the furnace, and the mullite tube was sealed. The glove bag was removed, and the mullite tube seal was attached to an Ar/NH$_3$ flow system. The tube seal was then evacuated to remove air and water vapor, then backfilled with Ar. Enough ammonia gas was then introduced to create an ammonia rich atmosphere at room temperature for 30 to 45 minutes as a pretreatment before heating.

The whiskers were heated from room temperature to 500° C. at a rate of 2° C./min. and held at 500° C. for 2 hours, then ramped from 500° C. to 1100° C. at 2° C./min. and held at 1100° C. for about 3 hours. The whiskers were then cooled at a 4° C./min. down ramp to room temperature. After cool down, the whiskers were easily broken up with a spatula and collected. The collected whiskers had a bronze colored TiN coating with a thickness of 40 to 45 nm. A loading of 0.20 g of Ti(NMe$_2$)$_4$ and 1.0 g of mullite whiskers, employing the same procedure, yields mullite whiskers with a golden colored TiN coating with a thickness of 70 to 85 nm.

The resultant whiskers were free flowing and appeared to have acceptable qualities for incorporation into a ceramic matrix.

EXAMPLE 2

SiO$_2$ Coatings on Mullite Whiskers 100 ml of absolute ethanol was added to 10.0 g of mullite whiskers in a 250 ml flask. 8.56 ml (8.0 g, 0.038 mol) of Si(OEt)$_4$ was added to this stirred suspension. The reaction suspension was stirred for two hours at room temperature, followed by the addition of two equivalents of distilled H$_2$O (1.38 ml). After an additional 20 hours of stirring with the flask open to atmosphere, the ethanol was removed in vacuo and the whiskers taken to dryness. The whiskers were placed in an alumina boat and fired in a mullite tube furnace by heating from room temperature to 500° C. at a rate of 2° C./min. and held at 500° C. for 2 hours, then ramped from 500° C. to 1000° C. at 2° C./min. and held at 1000° C. for 6 hours. The whiskers were then cooled at a 4° C./min. down ramp to room temperature. The SiO$_2$ coated mullite whiskers were collected as a white solid which broke up easily with a spatula.

Again, the resultant whiskers were free flowing and appeared to have acceptable qualities for incorporation into a ceramic matrix.

While my invention has been described in terms of a specific embodiment, it will be appreciated that other embodiments could readily be adapted by one skilled in the art. Accordingly, the scope of my invention is to be limited only by the following claims.

What is claimed is:

1. A mullite whisker combined with a uniform, continuous, non-particulate ceramic coating thereon, the whisker adapted for incorporation into a ceramic matrix material to form a whisker-reinforced ceramic composite having improved resistance to cracking and breakage, said coated whisker formed by:

mixing a solvent selected from the group consisting of hydrocarbon solvents, ethers, alcohols, and tetrahydrofuran and an organometallic coating precursor selected from the group consisting of Ti(NR$_2$)$_4$, Zr(NR$_2$)$_4$, Hf(NR$_2$)$_4$, V(NR$_2$)$_y$, Nb(NR$_2$)$_y$, Ta(NR$_2$)$_4$, Cr(NR$_2$)$_y$, Mo(NR$_2$)$_y$, W(NR$_2$)$_y$, (SiMe$_2$NH)$_x$, B(NMe$_2$)$_3$, Hf(NMe$_2$)$_4$, Zr(NMe$_2$)$_4$, Ti(OR)$_4$, Zr(OR)$_4$, Hf(OR)$_4$, V(OR)$_y$, Nb(OR)$_y$, Ta(OR)$_5$, Cr(OR)$_y$, Mo$_2$(OR)$_y$, W(OR)$_y$, Si(OEt)$_4$, Al(O$^s$Bu)$_3$, Zr (O$^n$Bu)$_4$, and mixtures thereof, with mulite whiskers having diameters between from about 4 to about 30 micrometers;

evaporating the solvent in vacuo to yield mullite whiskers coated with dried coating precursor; and pyrolyzing the dried precursor-coated mullite whiskers to form a uniform, continuous, non-particulate, ceramic coating on the mullite whiskers with a thickness of from about 40 to about 200 nanometers, whereby the resultant uniform, continuous, non-particulate ceramic coating reduces the fusion between the mullite whisker and the ceramic matrix material when said mullite whisker is incorporated into a ceramic matrix material to form a whisker-reinforced ceramic composite.

* * * * *